United States Patent [19]

Williams

[11] Patent Number: 4,661,253

[45] Date of Patent: Apr. 28, 1987

[54] SOLID WASTE SEPARATOR

[76] Inventor: Thomas C. Williams, 191 Pacemaker, Atwater, Calif. 95301

[21] Appl. No.: 763,442

[22] Filed: Aug. 6, 1985

[51] Int. Cl.⁴ .............................................. B01D 35/16
[52] U.S. Cl. ..................................... 210/411; 210/413; 210/499; 239/264; 55/230; 55/242
[58] Field of Search ............... 210/107, 108, 384, 499, 210/411, 433.1, 413–415; 55/230, 242; 239/225, 264

[56] References Cited

U.S. PATENT DOCUMENTS

| 1,410,434 | 3/1922 | Werstler | 239/264 |
| 4,113,626 | 9/1978 | Detcher | 210/433.1 |
| 4,233,159 | 11/1980 | Senda et al. | 210/413 |
| 4,250,038 | 2/1981 | Dryden | 210/433.1 |
| 4,268,382 | 5/1981 | Hanke et al. | 210/499 |
| 4,468,325 | 8/1984 | Yock et al. | 210/413 |

FOREIGN PATENT DOCUMENTS 660580  5/1938  Fed. Rep. of Germany ...... 239/225

Primary Examiner—Bernard Nozick
Attorney, Agent, or Firm—Flehr, Hohbach, Test, Albritton & Herbert

[57] ABSTRACT

A dairy waste separator provided with a separation screen and longitudinally oscillating water pipes as the cleaner.

10 Claims, 7 Drawing Figures

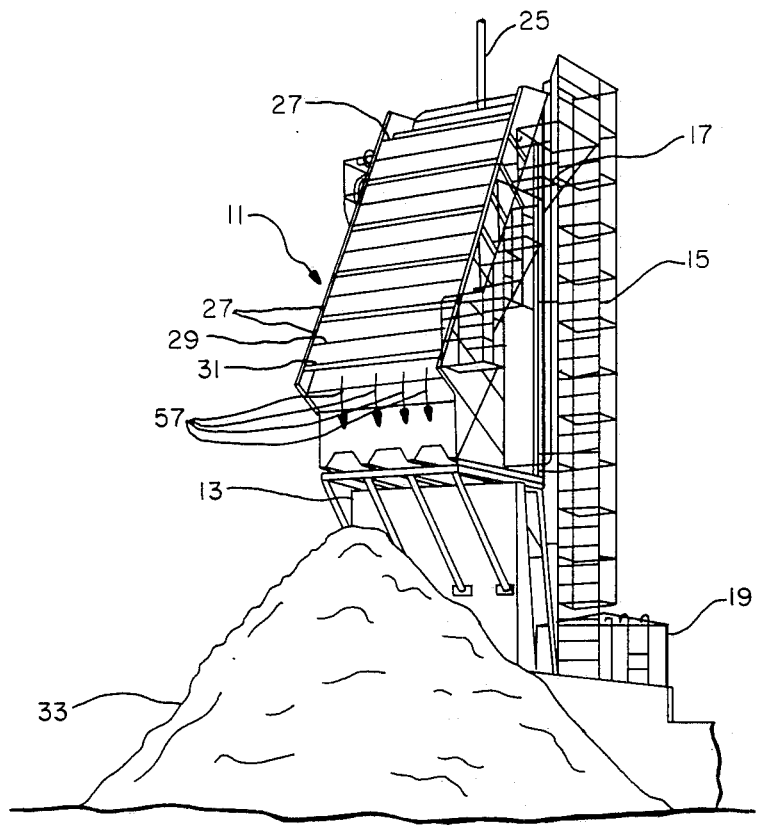
FIG.—1
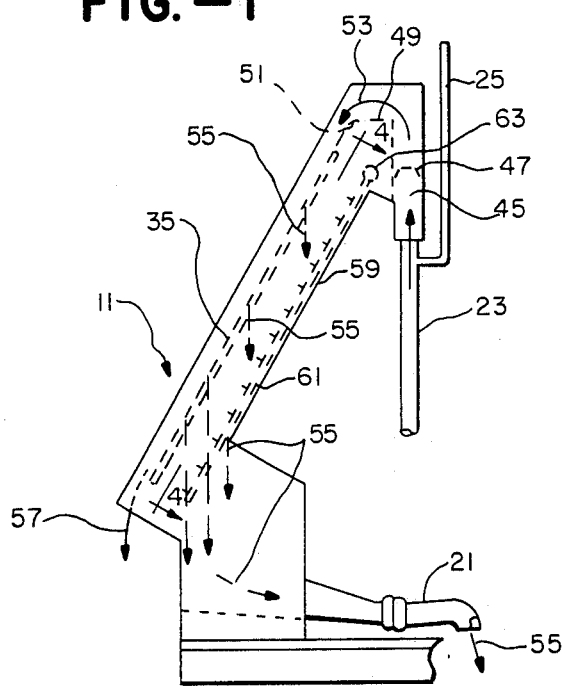
FIG.—2

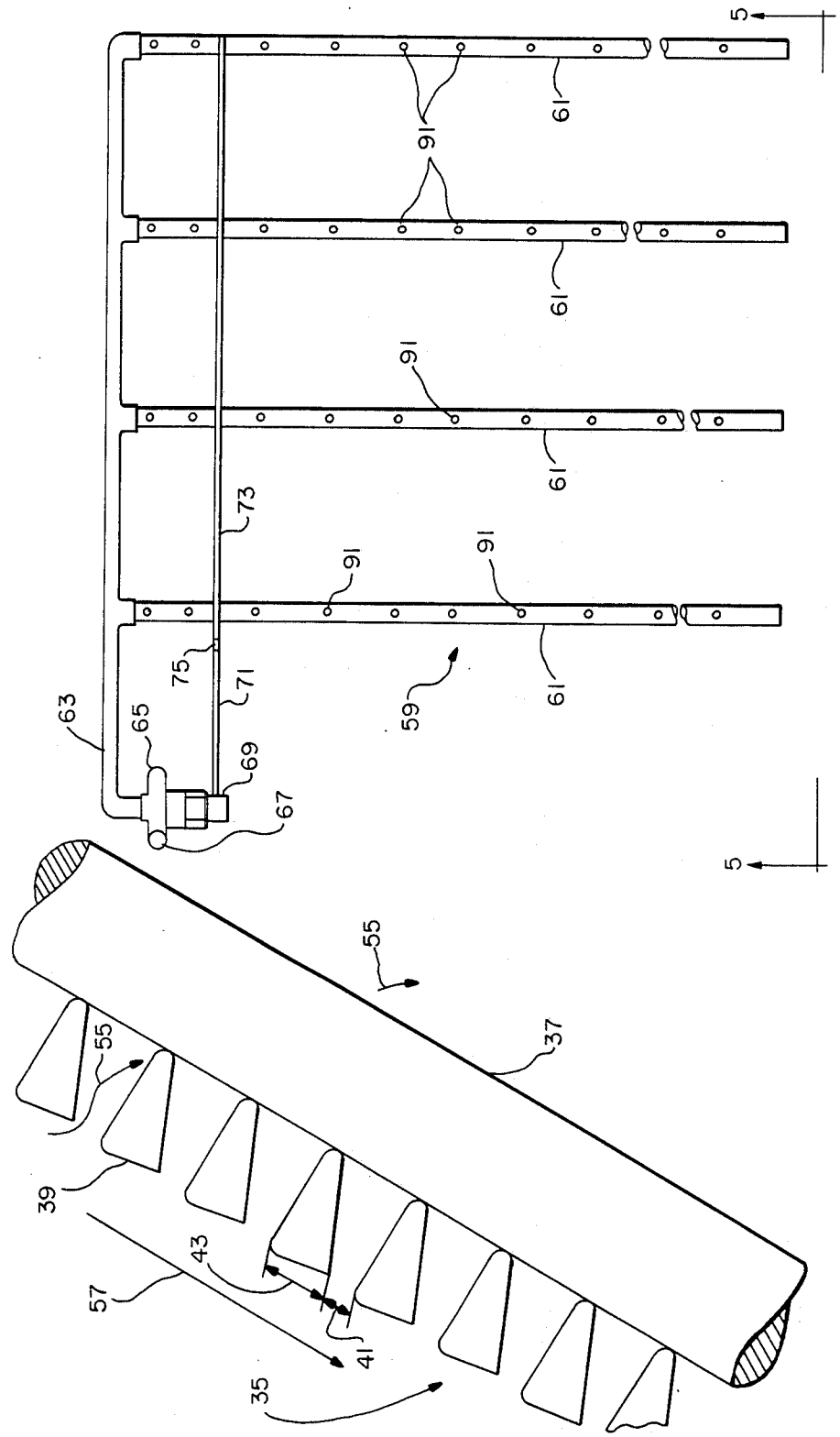

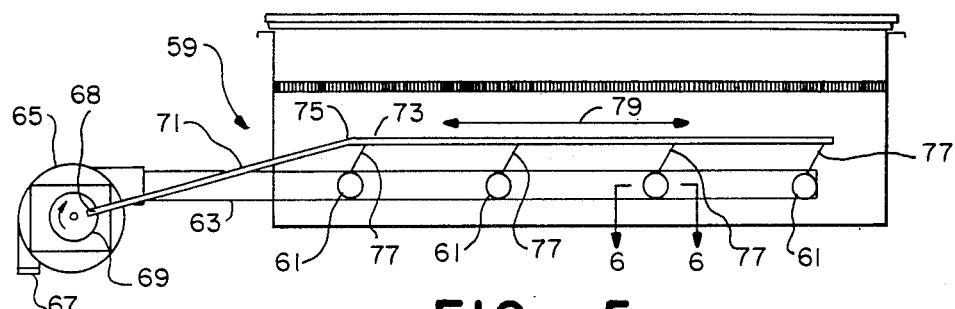
FIG.—5
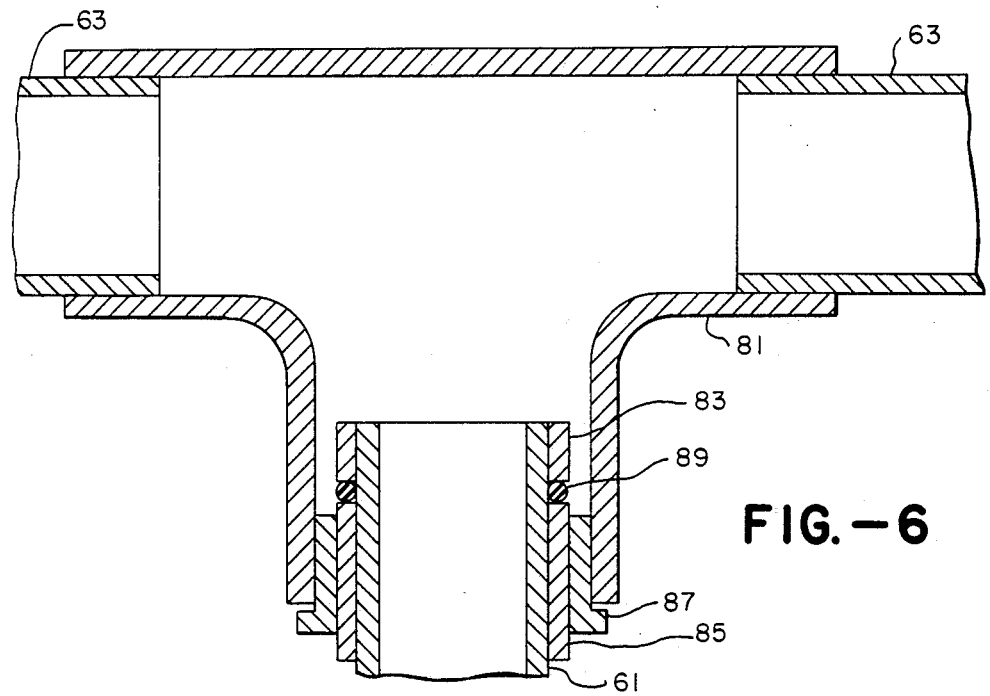
FIG.—6
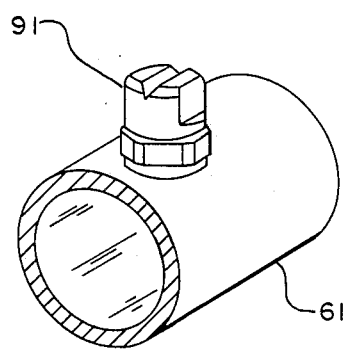
FIG.—7

SOLID WASTE SEPARATOR

The present invention is directed to a solid waste separator system and more specifically to such a system for dairy usage.

A waste separator system in a dairy must separate the solids from the liquid portions not only of the waste from each animal but also the daily maintenance and operation wastes such, for instance, as uneaten feed and the like. The separation must be sufficient that the liquid fraction is as clean as possible so as to reduce the requirements for cleaning the liquid waste holding pond. Moreover, the liquid waste should be as free as possible of any solids since the liquid is eventually mixed with irrigation water and carried into the fields for fertilization. In the event that the liquid fraction includes a large amount of solids, the solids are distributed unequally, usually saturating one end of the field, rendering it almost useless and requiring that the field be mechanically cleaned at considerable expense. Moreover, the separator itself should be as free as possible of maintenance keeping in mind that the waste includes a substantial amount of fines which can clog the separator screens and the screen cleaning nozzles.

It is, therefore, an object of this invention to provide an improved liquid waste separator.

Accordingly there is provided a liquid waste separator which comprises a separation screen at a relatively steep angle and with closely spaced screen wires thereby permitting smaller particles of solids to be captured by the screen. There is also provided an improved method of cleansing the screen after usage.

Referring to the drawing,

FIG. 1 is a perspective view of a solid waste separator and its supporting wall in accordance with the invention;

FIG. 2 is a side elevational view of the separator proper shown in FIG. 1 but with ladders and stairs removed for clarity;

FIG. 3 is an enlarged side elevational view of the screens used in the separator of FIG. 1;

FIG. 4 is an orthographic view of the fresh water wash system used in accordance with the invention taken generally from the top side thereof taken as shown by the line 4—4 of FIG. 2;

FIG. 5 is an end view of the fresh water wash system, taken as shown in the line 5—5 in FIG. 4;

FIG. 6 is a sectional view taken along the lines 6—6 of FIG. 5 showing the construction of the fresh water wash system; and FIG. 7 is a perspective view showing the position of one of the nozzles on the fresh water line.

Referring specifically to FIG. 1 there is shown a solid waste separator in accordance with the invention including the separator proper 11 mounted upon a support structure or wall 13 and including ladder 15 and stairway 17 for convenient personnel access. There is also included a holding tank 19 for a supply of fresh water to the system and a waste water line 21 (shown only in FIG. 2), as well as a waste feed line 23, also shown only in FIG. 2. A vent pipe 25 is connected to the waste feed line 23.

Preferably the separator includes a number of covers 27, each having one or more stiffening ribs 29 and a hinge 31 pivoted in the sides of the separator. The covers provide easy access to the interior of the separator proper while still keeping the parts protected from the elements and channeling the waste through the separator during operation and cleansing. Also as shown in FIG. 1, there is a dry waste pile 33 below the separator which pile can be removed and either utilized or discarded as desired.

The separator further includes a screen or a series of screens 35 which, as shown in FIG. 2, lie at an angle substantially greater than 45° and preferably of about 60° from the horizontal. The screens 35, as shown more clearly in FIG. 3, include two or more frame members 37 (only one frame member 37 is shown) together with a series of parallel screen wires 39 having a spacing between the wires of less than 0.05 inches. Preferably the screen wires are of the shape shown in FIG. 3 and incorporate a spacing 41 between the wires of 0.024 inch and having a dimension 43 across the short side thereof, as shown in FIG. 3, of 3/32 of an inch thereby giving an open area of 21.1%. Such screens have been purchased and are commercially available from Conn-Weld Industries, Inc. of Princeton, W. Va., the specific screen described above being known as Conn-Weld screen 0.024 inch opening width RC 3/32 wire. Because of the relatively steep angle of about 60° for the screen, relatively close spacing between the screen wires can be accommodated thereby permitting the separation of relatively fine solids from the liquid portion which would otherwise pass through the screen.

In the operation of the solid waste separator, shown in FIGS. 1, 2 and 3, waste is first flushed from the animal stalls which, in the case of cattle, are usually concrete feed stalls. The flushed waste including the animal effluent, unused feed and the flushing water itself is collected in a waste holding tank (not shown). When sufficient waste is accumulated in the tank it is pumped up the waste inlet pipe 23, as shown in FIG. 2 into the waste inlet tank 45 where a curved deflection plate 47 extends across a major portion of the horizontal area of the waste inlet and controls the turbulence of the waste water. The waste inlet tank 45 overflows at 49 over a curved weir 51 discharging substantially in alignment with the top of the screens 35. The curved weir 51 further reduces the turbulence of the waste water and provides a substantially non-turbulent or smooth flow. The waste flows over the weir 51 as shown by the arrow 53 and onto the top of the screen 35 where the solid material is separated from the liquid fraction. The arrows 55 show the flow of the liquid portion through the screen 35 and the arrow 57 shows the direction of the solid fraction over the screen 35 and onto a dry waste pile 33.

Waste water from the discharge line 21 is directed to a holding pond (not shown) where it may be stored until needed for further use such as for mixture with irrigation water.

Once the waste storage tank is exhausted its pump may be turned off either automatically or manually and the separator system is cleansed. The position of the cleansing apparatus in accordance with the invention is shown in FIG. 2 but the apparatus itself is more particularly shown in FIGS. 4, 5, 6 and 7. As can be seen the cleansing system 59 underlies and is generally parallel to the screens 35. The system preferably includes four oscillating water lines 61 rotatably coupled to a pressure feeder line 63. The water feeder line 63 is connected to the output of a water motor 65 whose inlet 67 is connected to a source of relatively high pressure water having a pressure of approximately 55 pounds per square inch. An eccentric 68 on the water motor's mechanical output 69 provides an oscillating movement to a link 71 which is pivotally connected to a tie rod 73 by means of a pin 75. Four cranks 77 are pivotally connected to the tie rod 73 and fixed to each of the lines 61 such that as the link 71 reciprocates, the tie rod 73 reciprocates, as shown by the arrow 79, and the lines 61 reciprocate about their longitudinal axes.

As shown more clearly in FIG. 6, the high pressure feeder line 63 may be in the form of a three inch diameter polyvinylchloride pipe and the innerconnection to the oscillating lines 61 may be fabricated by the use of a three inch polyvinylchloride T-connector 81 adhesively connected to the line 63. The line 61 may take the form of a two inch polyvinylchloride pipe onto which a collar 83 may be adhesively secured preferably by an epoxy weld. A short piece of 2½ inch polyvinylchloride pipe 85 and a 3 inch to 2½ inch polyvinylchloride reducer 87 is secured to each other and to the T-connector 81 so as to form a bearing for the rotating line 61. An O ring 89 may be disposed between the collar 83 and the pipe section 85 so as to reduce the amount of leakage at the oscillating connection.

The oscillating lines 61 include a number of nozzles 91 and it has been found that the specific nozzles used, particularly a nozzle producing a flat V shaped spray pattern and having an orifice diameter of 3/16 inch or more, performs well. It has been found that nozzles manufactured by Spraying Systems Company of Wheaton, Ill., specifically nozzles Model Number H¼U9570 brass perform well. Such a nozzle provides a spray angle in excess of 90° and has an orifice diameter of 13/64 of an inch. The nozzles are spaced along the rotating line 61 at approximately 12 inch intervals with the groove extending parallel to the axis of the line 61 as shown in FIG. 7.

In operation of the washer, after the waste pump has been cut off high pressure water is applied to the inlet 67 thereby causing operation of the water motor 65 and oscillation of the lines 61. Water from the high pressure lines is sprayed out the various nozzles 91 upwardly through the screen 35. Because of the oscillation of the pipe 61 the entire screen is sprayed with high pressure water from the nozzles 91 and solid fines are dislodged from between the wires 39. It has been found that the particular nozzles used, unlike numerous other nozzles attempted, not only satisfactorily clean the screen but also avoid being clogged by fines sifting through the screen.

It has been found that the wash system, as defined above, is sufficiently reliable that operation can be accomplished in an entirely automatic manner without the necessity of actual inspection to see whether the fines are, in fact, removed from the screens or that the nozzles themselves are clogged by fines. Thus it is apparent that in the waste separation system as defined above together with its cleansing system, the need for manual intervention is far reduced over what has been accomplished in the past.

What is claimed is:

1. A dairy waste separating system comprising a separation screen inclined at an angle substantially greater than 45° to the horizontal, said screen including a series of parallel screen wires separated from each other by less than 0.05 inches, means above said screen for providing a smooth flow of combined liquid and solid waste over said separation screen, means below substantially the full length of said separation screen for transporting in one direction the liquid separated from said waste and passing through the openings in said screen, means disposed below the lower end of the screen for transporting in a second direction those solids carried all the way down said screen cleaning means disposed below and generally parallel to said separation screen for cleaning said screen, said cleaning means comprising a plurality of water lines extending below said screen, means for oscillating said water lines about their longitudinal axes, a plurality of nozzles disposed along the upper side of each of said water lines and directed toward the lower side of said screen and means for supplying water to said water lines.

2. A dairy waste separating system as defined in claim 1 wherein said separation screen is inclined at an angle of about 60° to the horizontal.

3. A dairy waste separating system as defined in claim 1 wherein said screen wires are separated from each other by about 0.024 inches.

4. A dairy waste separation system as defined in claim 1 wherein said separation screen is inclined at an angle of about 60° to the horizontal and said screen wires are separated from each other by about 0.024 inches.

5. A dairy wash separation system as defined in claim 1 wherein said nozzles are flat V pattern nozzles.

6. A dairy waste separation system as defined in claim 1 wherein said nozzles are flat V pattern nozzles having an orifice diameter of at least 3/16 inch.

7. A dairy waste separation system as defined in claim 1 wherein said means for providing a smooth flow of combined liquid and solid waste comprises a waste inlet tank, a deflector disposed above the bottom of said waste inlet tank and extending across a major portion of the horizontal area thereof, overflow means connected to the top of said waste inlet tank, said overflow means including a curved weir having its discharge end substantially in alignment with the top of said separation screen and means for directing said combined liquid and solid waste into the bottom of said waste inlet tank.

8. A dairy waste separating system as defined in claim 7 wherein said separation screen is inclined at an angle of about 60° to the horizontal.

9. A dairy waste separating system as defined in claim 7 wherein said screen wires are separated from each other by about 0.024 inches.

10. A dairy waste separation system as defined in claim 7 wherein said separation screen is inclined at an angle of about 60° to the horizontal and said screen wires are separated from each other by about 0.024 inches.

* * * * *